United States Patent [19]
Trumpf et al.

[11] Patent Number: 5,549,824
[45] Date of Patent: Aug. 27, 1996

[54] FILTER APPARATUS INCLUDING STACKED INTAKE AND DISCHARGE PLATES

[75] Inventors: Rudolf Trumpf, Berne; Hans Jost, Wichtrach, both of Switzerland

[73] Assignee: Ing. A. Maurer SA, Berne, Switzerland

[21] Appl. No.: 397,753

[22] Filed: Mar. 2, 1995

[30] Foreign Application Priority Data

Mar. 7, 1994 [EP] European Pat. Off. ............ 94810142

[51] Int. Cl.⁶ .................................................. B01D 29/54
[52] U.S. Cl. ................... 210/323.1; 210/333.01; 210/346; 210/486
[58] Field of Search ............ 210/321.64, 321.72, 210/321.75, 321.84, 323.1, 333.01, 346, 411, 412, 486, 488

[56] References Cited

U.S. PATENT DOCUMENTS

| | | | |
|---|---|---|---|
| 3,989,629 | 11/1976 | Donovan | 210/323.1 |
| 3,994,810 | 11/1976 | Schaeffer | 210/103 |
| 4,592,838 | 6/1986 | Christophe et al. | 210/323.1 |
| 5,093,000 | 3/1992 | Rijkhof | 210/333.01 |
| 5,378,363 | 1/1995 | Christophe et al. | 210/333.01 |

FOREIGN PATENT DOCUMENTS

| | | |
|---|---|---|
| 0378192 | 7/1990 | European Pat. Off. . |
| 1761325 | 3/1972 | Germany . |
| 3239687 | 3/1984 | Germany . |
| 3403738 | 8/1985 | Germany . |

*Primary Examiner*—W. L. Walker
*Attorney, Agent, or Firm*—Jacobson, Price, Holman & Stern, PLLC

[57] ABSTRACT

The apparatus (1) comprises a first chamber (3) having an inlet (2) and a second chamber (23) having an outlet (24), with flow spaces disposed between the two chambers. The flow spaces are divided by a longitudinally running filter fabric (17) into an intake space (13) and a discharge space (14). The cross-section of the intake space continuously diminishes from the intake end to the discharge end, whereas the cross-section of the discharge space is smallest at the intake end and increases to a maximum toward the discharge end. Several filtering planes may be stacked about a hollow cylinder (4) forming the first chamber and run radially outward. The result is a filter apparatus in which the medium to be filtered is kept in continuous flow, and the filter fabric is optimally utilized.

10 Claims, 4 Drawing Sheets

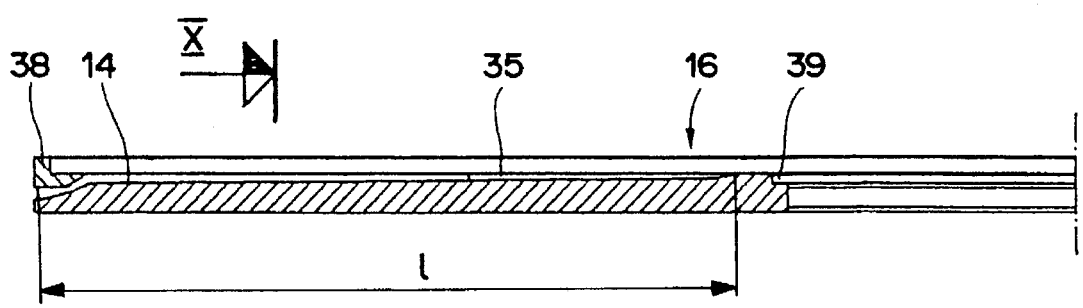
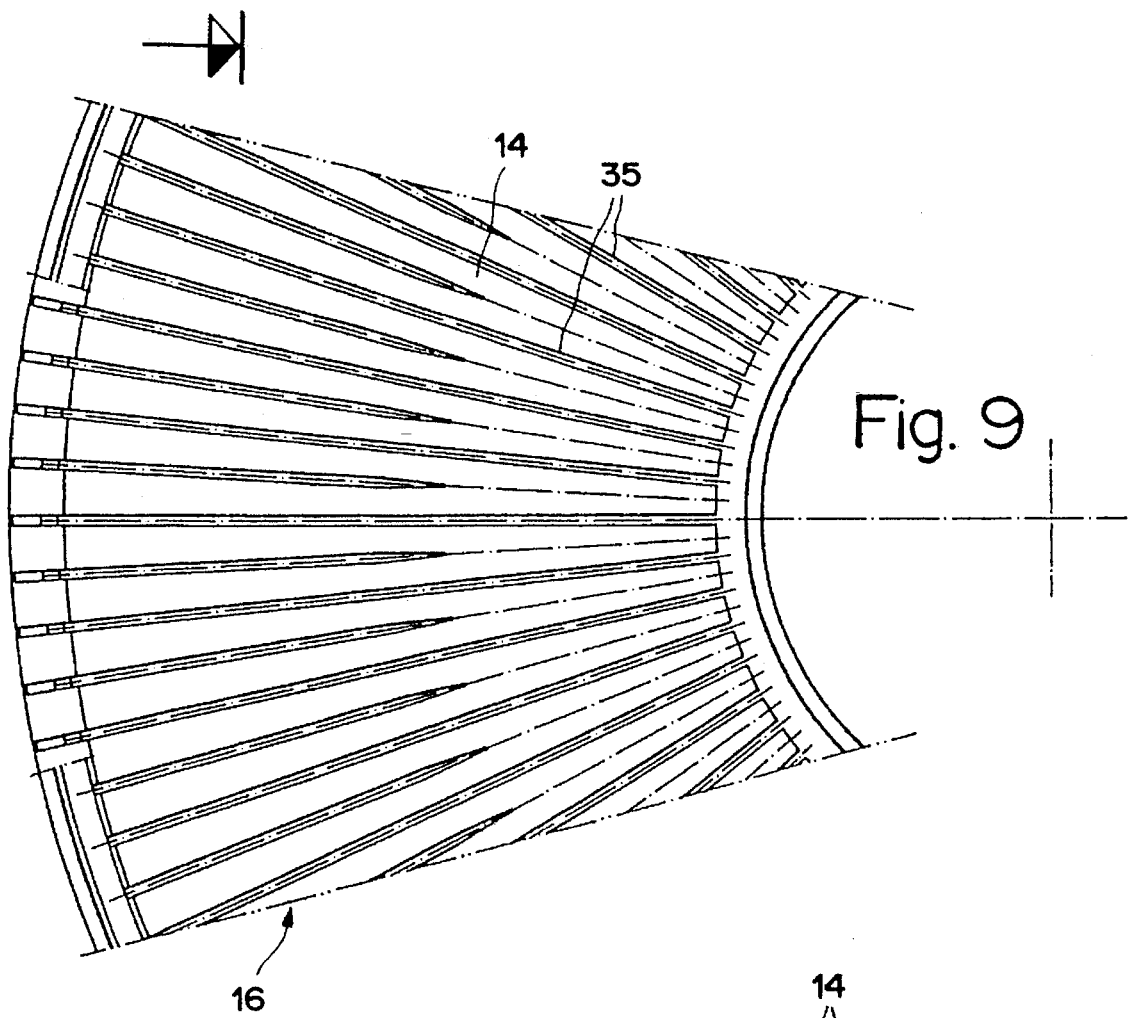
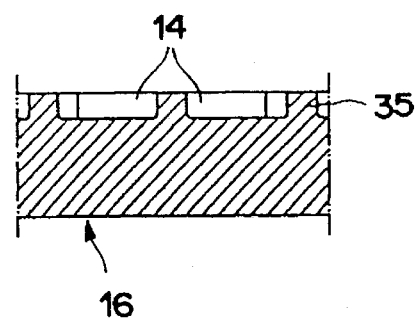

FILTER APPARATUS INCLUDING STACKED INTAKE AND DISCHARGE PLATES

BACKGROUND OF THE INVENTION

This invention relates to filters, and more particularly to apparatus for filtering fluid media, of the type having a first chamber provided with an inlet, a second chamber provided with an outlet, and ports disposed between the first and second chambers and provided with a filter fabric through which the medium to be filtered flows.

An apparatus of the foregoing type is particularly suitable for filtering high-viscosity media, especially such as tend to settle out, coagulate, crystallize, or gelatinize, or suspensions which tend to settle out in dead angles, which presents a well-known problem in the food industry.

An apparatus of this type has already been proposed. U.S. Pat. No. 3,994,810, for example, discloses such an apparatus having a cylindrical first chamber to which the medium to be filtered is conveyed via an inlet. The wall of the cylindrical first chamber includes ports behind which the filter fabric, likewise substantially cylindrical, is disposed. The cylindrical filter fabric is surrounded by a second chamber having an outlet.

The medium to be filtered flows via the inlet and the first chamber through the ports in front of the filter, penetrates the latter, and reaches the outlet via the second chamber. It has been found, however, that the medium does not flow uniformly through the filter since it takes the path of least resistance, namely the direct path between the inlet and outlet connections. In the areas through which less medium flows, deposits are formed, or the medium coagulates. This results in a loss of active filter surface.

Depending upon the production conditions, the discharge may vary. It has been found that with a small volume of flow, the area in which coagulated medium is deposited becomes larger.

When the discharge is increased, these deposits are broken up again. Part of the decomposed material then flows along once more in the stream of filtrate as a contaminant and can lead to malfunctions in subsequent further processing steps.

Another problem arises from the use of the perforated supporting pipe. Medium flows properly through the filter rings merely in the region of the perforations. This causes the occurrence of current shadows in which the medium may coagulate. The solids thus deposited cannot be broken up again by backflushing. The result is a significant loss of active filter surface.

There are also other prior art devices for filtering fluids which are constructed similarly to the aforementioned apparatus. Here the filter fabric is stretched directly over a perforated pipe. In this case, the filter fabric is inflated like a balloon during the filtering operation, so that it is lifted off the supporting pipe. It is then possible for solids to accumulated between the non-perforated region of the supporting pipe and the filter fabric. During backflushing, the filter fabric is flattened against the supporting pipe again, whereupon the deposited solids are pressed into the filter fabric. They can no longer be removed by means of backflushing. Demanding and expensive heat treatments are then required for cleaning the filter fabric.

SUMMARY OF THE INVENTION

It is an object of this invention to provide an improved apparatus for filtering fluids in which the medium to be filtered is kept in a continuous flux even in case of a varied discharge.

A further object of the invention is to provide filtering apparatus which has no areas where the medium can remain for a lengthy period of time.

Still another object of the invention is to provide a filtering apparatus wherein virtually the entire surface of the filter fabric can be utilized.

To this end, in the apparatus according to the present invention, of the type initially mentioned, the ports open out into at least one intake space having a length in the direction of flow; a discharge space running substantially parallel thereto is disposed at least along part of the length of the intake space, which discharge space is open toward the second chamber; a filter fabric is affixed between the intake space and the discharge space, which filter fabric divides the two spaces; and the intake space has at its intake-side end adjacent to the ports a maximum cross-section which decreases along the length toward its discharge-side end, while the cross-section of the discharge space is minimal at its intake-side end and correspondingly increases to a maximum cross-section along the length toward the discharge-side end.

By means of this design of the apparatus for filtering fluids, an optimum, continuous flux through the apparatus and the filter fabric is achieved even with a variable weight rate of flow, the filter fabric being utilized optimally.

One advantageous design of the invention consists in bounding the intake space and the discharge space by two adjacent plates, the filter fabric being inserted and held between the two plates so that a filtering plane is formed. By means of this arrangement, a very large filter fabric area, optimally utilized, can be made available with a very compact type of construction, it being ensured that the discharge of the medium to be filtered takes place continuously and that the time it remains in the filtering apparatus is brief.

This effect is advantageously increased if several filtering planes are disposed one above the other.

A further advantageous design of the invention consists in having the first chamber take the form of a hollow cylinder about which the intake spaces and discharge spaces are radially disposed. The plates bounding the intake and discharge spaces, and the filter fabric held between the plates, may each then be disk-shaped. The annular plates and the filter fabric may thereafter be slipped over the hollow cylinder, whereby a space-saving, compact mode of construction is achieved.

Two plates interact advantageously in respective pairs. A first plate then has on the intake side a first annular duct which is open toward the hollow cylinder and closed by respective first ring lands toward the upper and lower planes of the annulus. The intake spaces are incorporated in each of the two surfaces of the first plate and open out into the first annular duct. The second plate has on the discharge side a second annular duct which is open toward the second chamber and is likewise closed by respective second ring lands toward the upper and lower planes of the annulus. The discharge spaces, which are incorporated in each of the two surfaces of the second plate, then open out into the second annular duct. By means of this arrangement, the height of the filtering apparatus, i.e., the number of plates and consequently the size of the surface area of the filter fabrics inserted, can be varied virtually at will, depending upon what is required of this filtering apparatus.

In another advantageous design of the invention, circular rims are respectively affixed to the first and the second ring lands of the plates, each such rim, in the case of first and second plates joined in pairs or of first plates and closure plates, fitting into a matching recess in the other plate. Achieved by this means is optimum mutual guidance of the individual plates, on the one hand, and centering and sealing for the disk-shaped filter fabric inserted between the plates, on the other hand.

Affixed advantageously to the surfaces of the plates opposite the filter fabrics are support elements by means of which the filter fabric lying between the intake and discharge spaces can be supported and thus held in an optimum position. Optimum support of the filter fabrics is achieved when the support elements take the form of radial ribs having a substantially constant thickness over their entire length. Through the radial alignment of the ribs, the spacing between them increases continuously as the radius of the plates becomes greater. In order that the filter fabric may be optimally supported in the outer regions of the plates as well, an auxiliary rib likewise running radially outward is disposed between each two ribs from approximately the mid-region of the length of the ribs. The filter fabric is thereby optimally supported in this region as well.

A backflushing device in the form of a piston may be advantageously disposed in the hollow cylinder forming the first chamber, displaceable along the hollow body. By means of a piston having an annular drainage duct, a first annular duct, and thus the ports thereof can be covered, whereby this region of the apparatus may be backflushed in a manner known per se, while the other regions continue to be available for filtering.

BRIEF DESCRIPTION OF THE DRAWINGS

A preferred embodiment of the invention will now be described in detail with reference to the accompanying drawings, wherein:

FIG. 8 is a sectional view through a closure plate of the apparatus of FIG. 1 in the radial direction;

FIG. 9 is a top plan view of part of the closure plate; and

FIG. 10 is a cross-section taken on the line X—X of FIG. 8.

DESCRIPTION OF THE PREFERRED EMBODIMENTS

Figure 1:
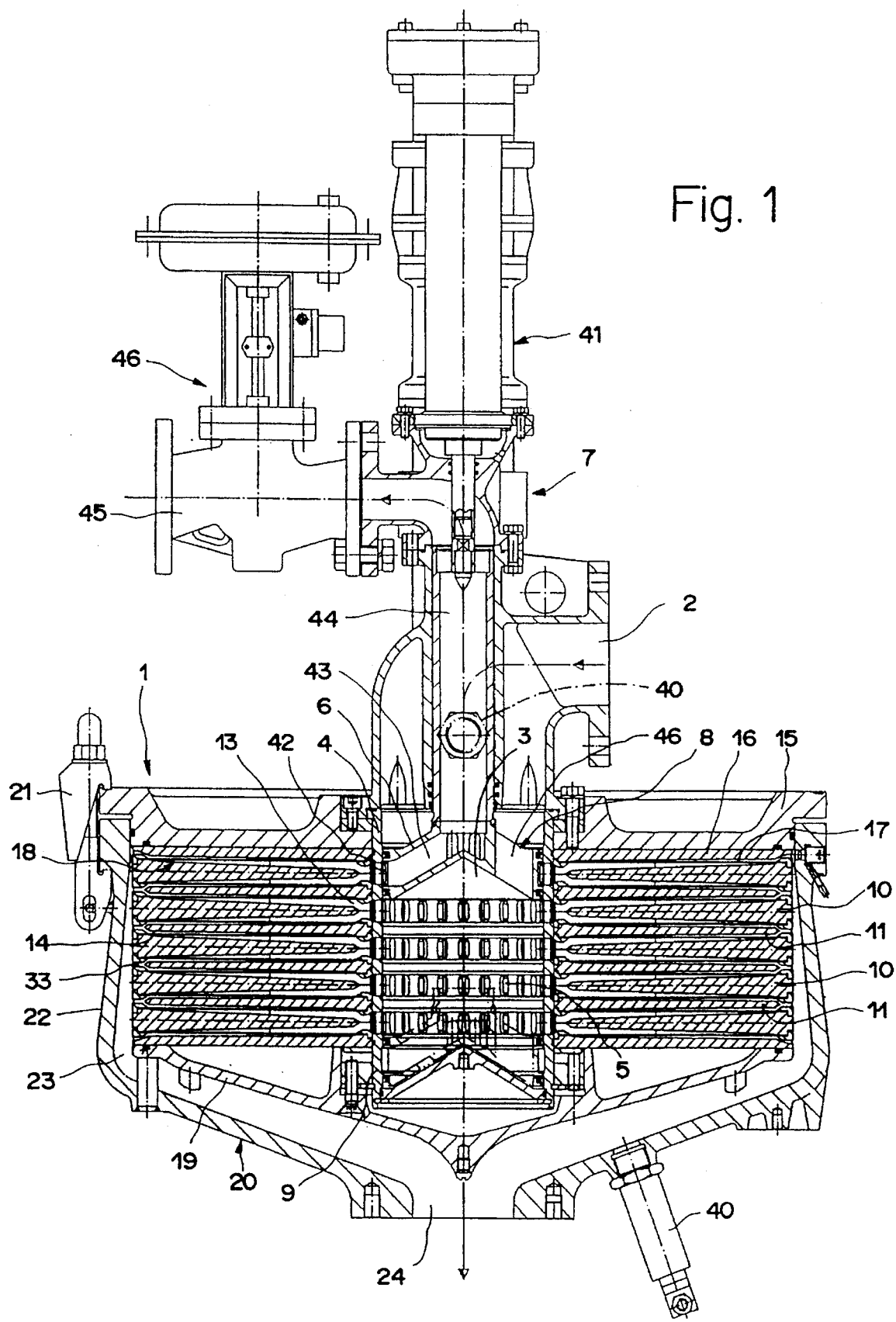
FIG. 1 is a cross-section of, an apparatus for filtering a fluid, having a centrally disposed first chamber and annular plates and filter fabrics disposed about this chamber.

As may be seen in FIG. 1, an apparatus 1 for filtering fluids comprises an inlet 2 opening out in a first chamber 3. Chamber 3 is formed by a hollow cylinder 4, the wall of which includes rings of ports 5.

Longitudinally displaceable in cylinder 4 is a piston 6 serving as part of a backflushing device 7. In FIG. 1, piston 6 is shown in a backflushing position 8, the function of which will be explained below. During the normal filtering operation, piston 6 is situated in an extension 9 of cylinder 4 which is closed tight. When piston 6 is in extension 9 of cylinder 4, all the ports 5 of first chamber 3 are free.

Disposed about cylinder 4 are annular first plates 10 and annular second plates 11. Incorporated in these first and second plates 10 and 11 are radial intake spaces 13 and discharge spaces 14, respectively. In each case, the intake spaces 13 of a first plate 10 and the discharge spaces 14 of a second plate 11 lie above one another so that the fluid can flow optimally through a filter fabric 17.

Secured to the inlet end of cylinder 4 forming first chamber 3 is an annular cover 15. A closure plate 16 is slid over cylinder 4 until it rests against cover 15. Closure plate 16 is provided on its surface remote from cover 15 with recesses forming the discharge space. Disk-shaped filter fabric 17 is placed on closure plate 16, then a first plate 10 is slipped over cylinder 4 so that filter fabric 17 is clamped between this first plate 10 and closure plate 16. The intake spaces 13 of plate 10 and the discharge spaces 14 of closure plate 16 thus form a first filtering plane 18 in which radial intake spaces 13 and discharge spaces 14 are disposed. On this first plate 10, another filter fabric 17 is placed, after which a second plate 11 is added. The further build-up of the filter part of the apparatus then takes place by alternately stacking first plates 10 and second plates 11, between which a filter fabric 17 is inserted each time. The intake space 13 of each plate 10 then comes to lie in the region of ports 5 of cylinder 4. The filter structure is terminated by another closure plate 16 lying on the bottom plate 10 and provided with the corresponding discharge space.

The bottom closure plate 16 is braced with an inner cover 19 fixed to cylinder 4.

Surrounding the entire filter structure and inner cover 19 is a vessel-shaped container 20 secured to cover 15 by means of clamp devices 21. With its container wall 22, container 20 forms, between the stacked first plates 10 and second plates 11, as well as the two closure plates 16, with filter fabrics 17 disposed therebetween and with inner cover 19, an outer annular chamber functioning as a second chamber 23 into which annular ducts 33 of the discharge portions 14 of second plates 11 open out. Container 20 is provided with an outlet 24.

During filtering of a fluid, this medium is conveyed via inlet 2 under an initial pressure (e.g., about 10 bars) into first chamber 3. From there, the medium flows through ports 5 into the intake spaces 13 of first plates 10, through the filter fabrics 17 into the discharge spaces 14 of second plates 11, whence the filtrate flows out into outer annular chamber 23. Chamber 23 has, in the direction of flow of the filtering operation, a flow profile which increases in the region of annular ducts 33 of discharge spaces 14 and thereafter remains constant and opens out into outlet 24.

Figure 2:
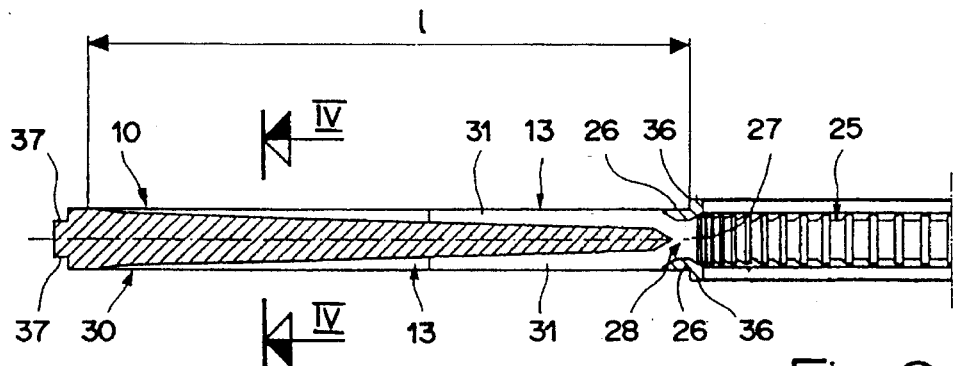
FIG. 2 is a sectional view through a first plate of the apparatus of FIG. 1 in the radial direction.

As may be seen in FIG. 2, first plates 10 have a first annular duct 25 on the intake side. Duct 25 is open toward cylinder 4 and particularly toward ports 5 of cylinder 4 (see FIG. 1), whereas toward the upper and lower planes of the annulus it is closed by respective first ring lands 26 which in turn rest against cylinder 4 (FIG. 1) and are connected to the foundation of first plate 10 by struts 27.

Intake spaces 13 are incorporated in the two annular surfaces of first plate 10; spaces 13 converge in the region of intake end 28 and open out into annular duct 25. Intake spaces 13 become increasingly shallow toward discharge end 30 of plate 10, whereby the flow profile becomes smaller.

Figure 3:
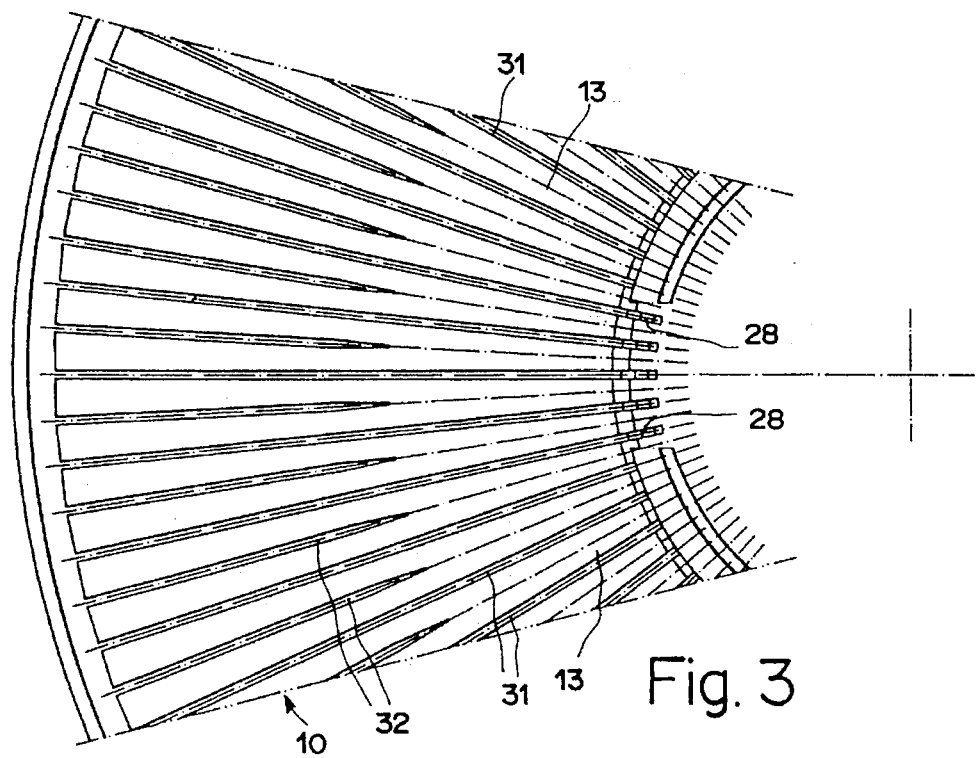
FIG. 3 is a top plan view of part of the first plate.

In the top plan view of a section of a first plate 10 shown in FIG. 3, an intake space 13 may be seen. In this embodiment, intake space 13 contains radial ribs 31 by which the filter fabric 17 to be placed thereon is supported. Ribs 31 are formed as a continuation of struts 27 and are of a constant thickness over their entire length. Consequently, the mutual spacing of ribs 31 increases as the radius of plate 10 becomes greater. For this reason, an auxiliary rib 32 running radially outward is disposed between each two ribs from the mid-region of the length of ribs 31, whereby filter fabric 17 is additionally supported.

Figure 4:
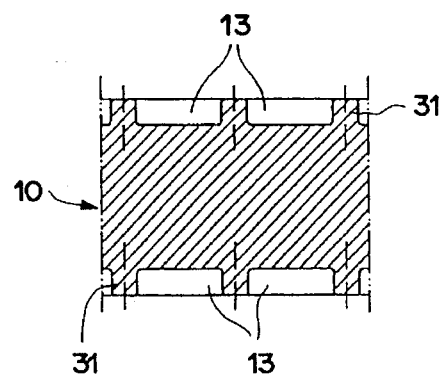
FIG. 4 is a cross-section taken on the line IV—IV of FIG. 2.

The cross-section of FIG. 4 shows ribs 31 bounding each intake space 13, the latter still being quite shallow in this region.

Figure 5:
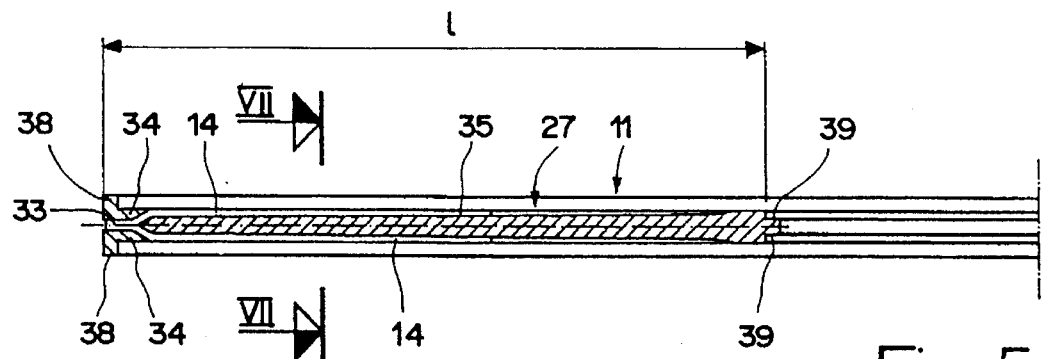
FIG. 5 is a sectional view through a second plate of the apparatus of FIG. 1 in the radial direction.
Figure 6:
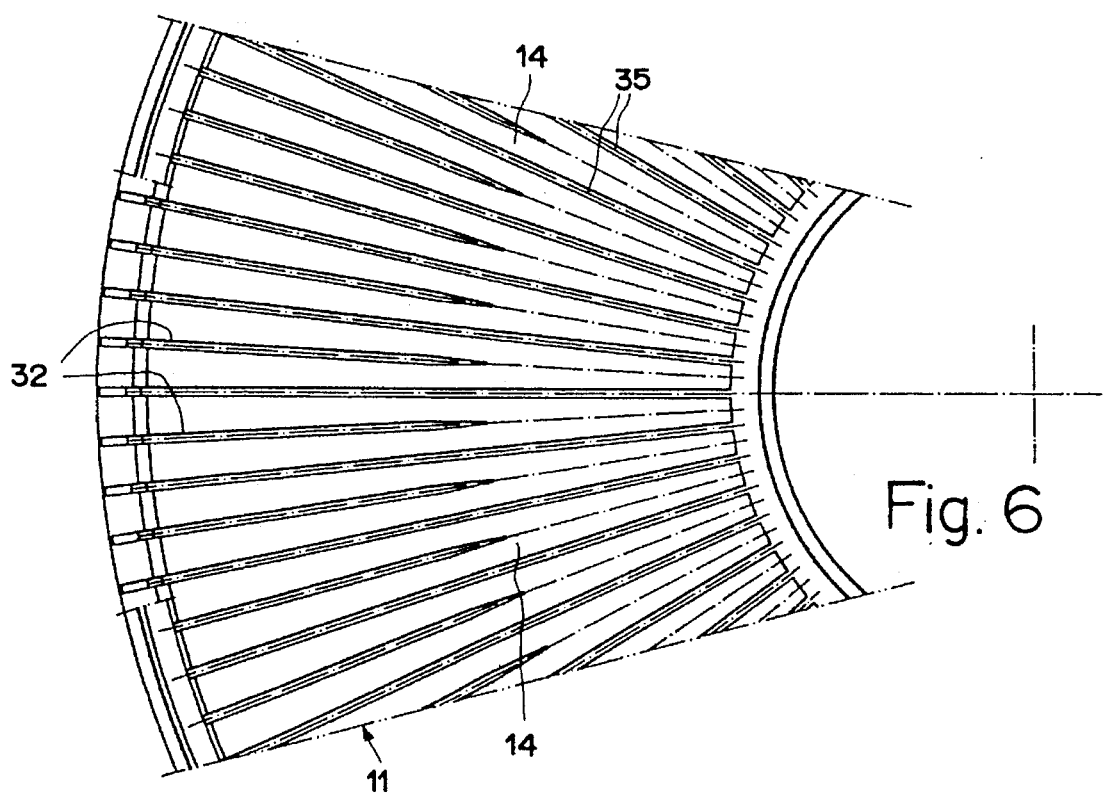
FIG. 6 is a top plan view of part of the second plate.
Figure 7:
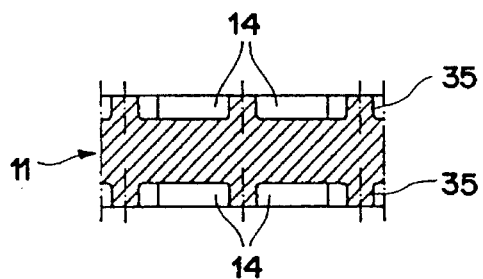
FIG. 7 is a cross-section taken on the line VII—VII of FIG. 5.

The structure of second plates 11 may be seen from FIGS. 5–7. Each plate 11 has on the discharge side a second annular duct 33 which is open toward the outer annular chamber 23 (see FIG. 1) and closed toward the upper and lower planes of the annulus by respective second ring lands 34 connected by struts to plate 11. Discharge spaces 14, incorporated in the two surfaces of plate 11, contain radial ribs 35 serving to support filter fabric 17. Discharge spaces 14 become shallower as the radius of plate 11 becomes shorter.

In the case of second plates 11, ribs 35 are also of a constant thickness over their entire length. Hence plates 11 are also provided with auxiliary ribs 32 disposed between ribs 35.

The first plates 10 and second plates 11 described above can now be stacked so that ribs 31 of each plate 10 and ribs 35 of each plate 11 and of closure plates 16 lie one above the other. It is also conceivable for plates 10, 11, and 16 to be stacked in such a way that the respective ribs 31 and 35 do not come to lie one above the other but are mutually offset instead.

Filter fabric 17 is placed between the plates (see FIG. 1), clamped between ring lands 26, 34 and the respective areas of plates 10, 11, 16, and supported by ribs 31 and 35. The flow space is divided by filter fabric 17 into intake space 13 and discharge space 14, the cross-section of intake space 13 being largest at the intake end and decreasing toward the discharge end. The cross-section of discharge space 14 is smallest at the intake end and increases to a maximum cross-section toward the discharge end. The overall cross-section of the flow space thus remains substantially constant.

Instead of ribs 31 and 35 in the intake spaces 13 and discharge spaces 14, respectively, serving to support filter fabric 17, supports of other shapes may be used. They may, for instance, take the form of pins disposed either one above the other or staggered for supporting filter fabric 17.

It is also conceivable to do without any supports in intake spaces 13 and discharge spaces 14, so that filter fabric 17 would only be stretched between ring lands 26, 34, cooperating with the respective contact area of the adjacent plate.

In order that the first plates 10 and second plates 11 may be properly stacked, plate 10 has at its inside edge on both sides in the vicinity of first ring lands 26 a protruding circular rim 36, as may be seen in FIG. 2. On the outside, plate 10 is provided on both sides with a circular recess 37. As shown in FIG. 5, every second plate 11 is provided on the outside with a circular rim 38 protruding on both sides, whereas on the inside there is a circular recess 39. When plates 10 and 11 are laid on top of one another, rim 36 of plate 10 fits into recess 39 of plate 11, while rim 38 of plate 11 fits into the matching recess 37 of plate 10. Thus centering of the two plates is achieved, and filter fabric 17 can be readily positioned, clamped in, and sealed.

Closure plate 16 illustrated in FIGS. 8–10 is constructed in the same way as second plate 11 but has discharge spaces 14 on only one of its annular surfaces, the outer surface remote from filter fabric 17 being plane. One of these closure plates 16 serves to close a filter packet constructed as in FIG. 1.

By means of this structure of apparatus for filtering fluids, an optimum, continuous flux of the medium is achieved though the arrangement and design of the regions through which the medium flows, the rate of flow of the medium in the filtering apparatus being constant. Moreover, a large filtering area is made available by means of this arrangement.

When apparatus 1 of FIG. 1 has been in operation for a certain length of time and filter fabric 17 is consequently clogged by the residue filtered out of the medium, the pressure of the unfiltered medium rises slightly in first chamber 3, this pressure being somewhat higher than that in second chamber 23. This increase in pressure (differential pressure) may be determined by means of two pressure sensors 40. The control loop of sensors 40 then causes backflushing device 7 to be started. For this purpose, piston 6 is moved via a linear drive 41 from extension 9 of cylinder 4 to any desired backflushing position of the rings of ports 5. Piston 6 thereby covers one ring of ports 5 with an annular duct 42 on the surface of the piston. Annular duct 42 communicates via radially disposed apertures 43 with a hollow piston rod 44 opening out into a sedimentation line 45.

In any backflushing position of piston 6, medium to be filtered continues to be supplied to first chamber 3 through inlet 2, this medium flowing through piston 6 via axial apertures 46 between radial apertures 43. Via the ports not covered by piston 6, this medium flows through intake spaces 13, filter fabric 17, and discharge spaces 14 into second chamber 23. As soon as piston 6 has moved to a backflushing position, a small part of the filtrate is conveyed from chamber 23 through the respective discharge spaces 14 in the opposite direction through filter fabric 17; filter residue clinging to filter fabric 17 is thereby flushed away and is conveyed through intake spaces 13 and ports 5 into annular duct 42 of piston 6, whence this medium containing filtration residue is led through radial apertures 43 and hollow piston rod 44 to sedimentation line 45.

By displacing piston 6 in cylinder 4 onto another ring of ports, this backflushing operation can be carried out for all filter fabrics 17 disposed in apparatus 1 while the filtering operation continues. Consequently, it is not necessary to interrupt the filtering operation for backflushing and cleaning of filter fabric 17.

The amount of backflushing medium containing filtration residue can be set by means of a control valve 46, as well as the length of time piston 6 remains in a backflushing position.

The use of such filtering apparatus is conceivable for virtually any type of fluid.

What is claimed is:

1. In an apparatus for filtering a fluid medium comprising a first chamber provided with an inlet, a second chamber provided with an outlet, a plurality of ports disposed between said first and second chambers, and at least one filter fabric, wherein the improvement comprises:

at least one intake space means having an intake end and a discharge end and gradually decreasing in cross-section toward said discharge end, said ports opening out into said at least one intake space means at said intake end, at least one discharge space means running substantially parallel to said at least one intake space means and having an intake portion and a discharge portion, said at least one discharge space means being open toward said second chamber at said discharge portion and gradually increasing in cross-section toward said discharge portion, said at least one filter fabric being respectively fixed between and separating said at least one intake space means and said at least one discharge space means in a longitudinal plane, and at least one pair of adjacent plates respectively bounding said at least one intake space means and said at least one discharge space means, said at least one filter fabric being respectively clamped and held between each of said at least one pair of adjacent plates, whereby at least one filtering plane is formed in the longitudinal plane.

2. The apparatus of claim 1, further comprising a container having a wall surrounding said at least one pair of adjacent plates and said at least one filter fabric and forming said second chamber, said first chamber taking the form of a hollow cylinder about which said at least one filtering plane is radially disposed, said at least one pair of adjacent plates and said at least one filter fabric each having the shape of annular disk capable of accommodating said cylinder.

3. The apparatus of claim 2, wherein each of said at least one pair of adjacent plates comprises an annular first plate having an intake side which includes a first annular duct open toward said cylinder, said first annular duct being disposed between respective first ring lands located toward upper and lower surfaces of the first annular plate, said at least one intake space means being incorporated in each of the upper and lower surfaces of said annular first plate and opening out into said first annular duct; and an annular second plate having a discharge side which includes a second annular duct open toward said second chamber and disposed between respective second ring lands located toward upper and lower surfaces of the annular second plate, said at least one discharge space means being incorporated in each of the upper and lower surfaces of said annular second plate and opening out into said second annular duct; and a respective one of said at least one filter fabric being clamped between one of said first ring lands and said annular second plate or a closure plate and between one of said second ring lands and said annular first plate.

4. The apparatus of claim 3, wherein said ports are disposed in rings in a circumferential wall of said cylinder in such a way that each of said rings is situated in the vicinity of one of said first annular ducts.

5. The apparatus of claim 3, wherein each of said first ring lands and each of said second ring lands include a circular rim and each of said pair of adjacent plates includes a matching recess, each circular rim fitting into a respective matching recess when said annular first and said annular second plates, or said annular first and said closure plates, are joined in pairs.

6. The apparatus of claim 2, further comprising a plurality of support elements affixed to said at least one pair of adjacent plates between respective ones of said intake space means and discharge space means for supporting said at least one filter fabric.

7. The apparatus of claim 6, wherein said support elements are disposed as radial ribs of substantially constant thickness affixed to said at least one pair of adjacent plates and extending over at least part of an overall length of said at least one pair of adjacent plates.

8. The apparatus of claim 2, further comprising a backflushing device having a sedimentation line and at least one piston disposed in said cylinder for longitudinal displacement therein so as to selectively block one of a plurality of port rings defined circumferentially around said cylinder, said piston including an annular duct by which said one of a plurality of port rings communicates with said sedimentation line.

9. The apparatus of claim 8, further comprising means for bringing said at least one piston into a disengaged position wherein all of said ports are unobstructed, thus allowing the fluid medium to flow through all of said ports, said at least one intake space means, and said at least one discharge space means.

10. The apparatus of claim 1, further comprising two closure plates and a plurality of said filter fabrics disposed in a stack between said two closure plates defining a plurality of filtering planes.

* * * * *